Patented Feb. 13, 1923.

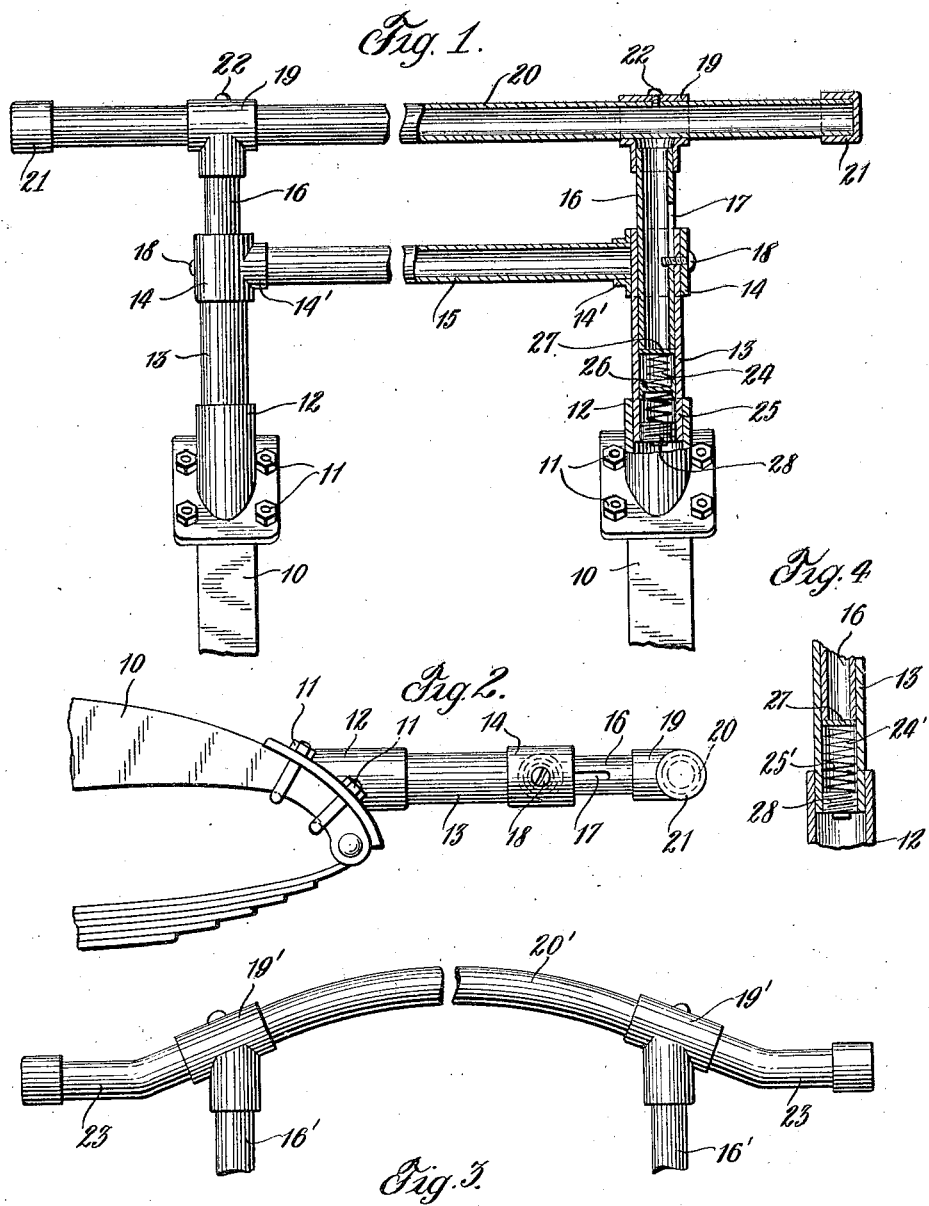

1,445,138

UNITED STATES PATENT OFFICE.

PETER HUELS, OF HOBOKEN, NEW JERSEY.

AUTOMOBILE SAFETY BUMPER.

Application filed November 7, 1922. Serial No. 599,602.

*To all whom it may concern:*

Be it known that I, PETER HUELS, a citizen of Germany, and resident of Hoboken, in the county of Hudson and State of New Jersey, have invented certain new and useful Improvements in Automobile Safety Bumpers, of which the following is a specification.

This invention relates to bumpers in general and particularly to the kind adapted for use in connection with vehicles.

The prime object of my invention is to provide a simple inexpensive device consisting mostly of standard shapes of tubing or piping and standard fittings and combining all the requirements of an efficient vehicle guard.

Another object of my invention is to provide in combination with such bumper, spring means of various compressibility, so as to assure yielding of the bumper bar to either a slight or heavy impact.

Another object of my invention is to provide within such arrangement means for limiting the movements of parts adapted to absorb a shock imparted to them.

The foregoing and further objects will be more fully apparent from the following description and the accompanying drawings, forming part of this specification, and in which:

Figure 1 is a top view of my device partially in section.

Figure 2 is a side elevation thereof.

Figure 3 is a portion of a bumper in modified form.

Figure 4 is a detail cross-sectional view of a modified spring means construction.

Referring to the drawings, numeral 10 denotes the end of a chassis frame to which is secured, by bolts or other means, indicated at 11, a tubular mounting or socket 12, preferably in the shape of a standard pipe fitting.

Associated with the latter is a tubular extension 13, which is threaded into the socket portion 12 or fastened otherwise thereto. At the end of extension 13 there is provided a standard T-fittings 14 so arranged that its reduced extension 14' is turned inwards, that is, the T-fittings 14 of both mountings are symmetrically arranged, as clearly seen in Figure 1. Connecting extensions 14' and spacing the tubular mountings is a tube or pipe 15 preferably of standard pipe dimensions. Slidably mounted within each of extensions 13, there is a telescoping pipe or tube 16 provided with a longitudinal slot 17, registering with a pin or screw 18, passed from the side of and through T-fittings 14 and extension 13. This arrangement limits the movement of telescoping members 16, relative to mounting 12. At the free ends of telescoping tubes 16 there are provided T-fittings 19. Passing through the larger portion of their bodies is a tubular bumper bar 20 provided at its ends preferably with standard caps 21. Bar 20 is preferably made of a standard pipe and is secured to T-fittings 19 by means of screws or pins 22.

The shape of the bumper bar may vary as may be seen in Figure 3 where bumper bar 20' is curved at its center portion, while its ends 23, are substantially at right angles with telescoping members 16'. Due to the shape of bar 20' the T-fittings 19' must be also of a different shape as clearly shown in Figure 3. Disposed within tubular mounting 12 (Figure 1) there is provided a coil spring 24 and another coil spring 25, separated from each other by a slide 26 which is guided within tubular extension 13. Coil 24 is more compressible than coil 25, which latter is of heavier construction. Coil spring 24 bears against circular plate 27, abutting with the end of telescoping member 16. Coil spring 25 bears against a plug 28 screwed into tubular extension 13. The spring means is designed for the purpose of absorbing not only a slight shock, but also a heavy shock imparted to bumper bar 20, which is of great importance, particularly where heavy traffic is to be considered and where the cars are made to stop at crossings frequently and where cars move closely to each other. When a number of cars practically touch each other and a slight movement is made by one of the cars and when such car would be equipped with bumpers yielding only to heavy impacts, the slight movements of the one car would cause the cars pressing against it to follow its movement. If, however, such a car would be equipped with bumpers yielding at a slight pressure the car may move a limited distance without affecting the cars abutting it.

This feature also becomes of great importance when a car happens to hit a person. If a bumper of heavy resistance is provided, an injury to the person due to the impact might be fatal. If, however, the person is hit by a bumper which readily yields to a slight pressure, the danger of fatal injury is considerably reduced. In Figure 1 there is shown a particular construction of the spring means where springs of various compressibility are shown to be separated by a slide member 26. In Figure 4 it will be seen that it is also possible to combine the springs into one or weld a lighter and a heavier spring (24' and 25' respectively) together to take the place of the two springs shown in Figure 1. In this manner somewhat better results may be obtained. By means of plug 28 the tension of the shock absorbing spring elements may be adjusted.

Having thus described my invention, be it known that while I have shown a specific construction of my device I shall not be limited to the showing and I reserve for myself the right to make changes or improvements within the scope of my invention to meet various conditions arising from the manifold construction of vehicles.

I claim:

1. In a vehicle bumper, a tubular mounting adapted to be associated with the frame of a vehicle, a telescoping tubular member slidably mounted in said mounting, means for limiting the motion of said member within said mounting, and spring means within the latter bearing against the said member, and composed of elements of various compressibility.

2. In a vehicle bumper, a tubular mounting adapted to be associated with the frame of a vehicle, a telescoping tubular member slidably mounted in said mounting, a tubular bumper bar attached to said member, means for limiting the movement of said member within said mounting and double spring means of various compressibility within said mounting and permanently bearing against said member.

3. In combination with a vehicle frame, a bumper, comprising a tubular mounting adapted to be associated with a frame, a telescoping tubular member slidable in said mounting, a bumper bar secured to said member, means for limiting the movement of said member in said mounting, and spring of said member, said spring means composed of spring members of various compressibility.

4. In combination with a vehicle frame, a bumper, comprising a tubular socket adapted to be associated with the frame, a tubular telescoping member slidably mounted within said socket, means for limiting the motion of said member, spring means within said socket, and bearing against said member and composed of two helical springs, one less compressible than the other.

5. In combination with a vehicle frame, a bumper, comprising a pair of tubular sockets, a pair of tubular members telescoping and slidably mounted within said sockets, a tubular connection spacing said telescoping members, means for limiting the motion of the latter within said sockets, and a double spring, composed of two coils, one of lesser compressibility than the other, in each of said sockets and bearing against the respective telescoping members.

6. A vehicle bumper of substantially standard piping and fittings comprising in combination a pair of tubular sockets, a tubular extension permanently associated with each socket, a fitting at the end of each extension, a tubular spacing connection between the fittings a telescoping tubular member, provided with a longitudinal slot, slidably engaging each extension, means provided in said extensions and registering with the slots of said members for limiting the movement of the latter, a pipe fitting arranged at the end of each telescoping member, a bumper bar held in said pipe fittings, spring means of variable compressibility secured within said sockets and bearing against said tubular members, and means for adjusting the tension of said spring means.

Signed at New York in the county of New York and State of New York this 25 day of October, A. D. 1922.

PETER HUELS.